(12) United States Patent
Huang

(10) Patent No.: US 8,582,296 B2
(45) Date of Patent: Nov. 12, 2013

(54) LAPTOP COOLING PAD WITH HEAT-DISSIPATING FAN ADJUSTABLE IN POSITION

(76) Inventor: Cheng Yu Huang, Taipei (TW)

(*) Notice: Subject to any disclaimer, the term of this patent is extended or adjusted under 35 U.S.C. 154(b) by 214 days.

(21) Appl. No.: 13/288,729

(22) Filed: Nov. 3, 2011

(65) Prior Publication Data

US 2013/0114205 A1    May 9, 2013

(51) Int. Cl.
   *H05K 7/20*  (2006.01)
(52) U.S. Cl.
   USPC ............. 361/695; 361/679.47; 361/679.48; 361/679.58; 361/726; 361/733; 174/16.1; 174/17 R; 415/213.1; 415/214.1
(58) Field of Classification Search
   USPC ............ 361/676–678, 679.46–679.54, 361/688–720, 724–733, 752, 807–808
   See application file for complete search history.

(56) References Cited

U.S. PATENT DOCUMENTS

| | | | | |
|---|---|---|---|---|
| 4,739,445 | A * | 4/1988 | Tragen | 361/695 |
| 6,236,564 | B1 * | 5/2001 | Fan | 361/695 |
| 6,373,698 | B1 * | 4/2002 | Christensen | 361/695 |
| 6,594,148 | B1 * | 7/2003 | Nguyen et al. | 361/695 |
| 8,295,041 | B2 * | 10/2012 | Cheng et al. | 361/679.48 |
| 2002/0060900 | A1 * | 5/2002 | Qiu | 361/683 |
| 2003/0016494 | A1 * | 1/2003 | Chen | 361/687 |
| 2003/0227757 | A1 * | 12/2003 | Vincent et al. | 361/796 |
| 2006/0279929 | A1 * | 12/2006 | Chen | 361/697 |
| 2008/0316692 | A1 * | 12/2008 | Jacobs et al. | 361/683 |
| 2011/0235269 | A1 * | 9/2011 | Zhou et al. | 361/679.48 |

* cited by examiner

*Primary Examiner* — Courtney Smith
(74) *Attorney, Agent, or Firm* — Jackson IPG PLLC

(57) ABSTRACT

A laptop cooling pad having one or more heat-dissipating fans adjustable in position is disclosed. The laptop cooling pad is provided with a ventilation portion so that a heat-dissipating fan can be mounted on the ventilation portion through a fan support. The ventilation portion has a groove for receiving pushing nodes of the fan support so that a user can push the pushing nodes to move the heat-dissipating fan inside the laptop cooling pad and make the heat-dissipating fan close to a heat source, thereby ensuring the heat-dissipating effect of the laptop cooling pad.

4 Claims, 6 Drawing Sheets

LAPTOP COOLING PAD WITH HEAT-DISSIPATING FAN ADJUSTABLE IN POSITION

BACKGROUND OF THE INVENTION

1. Technical Field

The present invention relates to laptop cooling pads having heat-dissipating fans, and more particularly, to a laptop cooling pad having one or more heat-dissipating fans adjustable in position.

2. Description of Related Art

Laptop computers are made to be portable, and when working with the developed wireless internet access, can vigorously function everywhere. With the related engineers' efforts, laptop computers have recently been developed to be light and compact and provide continuous usage. For all these reasons, existing laptop computers are highly welcome and extensively used by people for various works in diverse occasions.

However, due to its configuration, a laptop computer is innately inferior to other IT devices such as personal computers and server computers in terms of heat dissipation. As known, a laptop computer typically has its hard drive, CPU and power supply settled near its bottom (back), and the heat generated by these components has to be dissipated or the accumulated heat can eventually damage the entire device.

For properly dissipating heat from laptop computers, many laptop cooling pads or similar devices that facilitate heat dissipation of a laptop computer placed thereon have been developed with various materials, configurations and sizes.

A conventional laptop cooling pad uses heat-dissipating fans fixedly mounted thereon to generate air flow that brings heat away from the laptop computer it supports, so as to achieve heat dissipation. However, laptop computers from different manufacturers may have their heating portions located differently, so the cooling pad with the immovable heat-dissipating fans can not ensure best heat-dissipating effect while being used with different laptop computers.

SUMMARY OF THE INVENTION

In view of the shortcomings of the conventional laptop cooling pad, the inventor of the present invention has conducted researches and tests and finally developed a laptop cooling pad with heat-dissipating fans adjustable in position, as disclosed herein.

To overcome the shortcomings of the conventional laptop cooling pad, the present invention provides a laptop cooling pad having a ventilation portion for movably receiving a fan seat whereon a heat-dissipating fan is mounted. The ventilation portion is provided with a groove where pushing nodes of the fan support can be inserted into so that a user can move the heat-dissipating fan inside the cooling pad by pulling the pushing nodes in order to place the heat-dissipating fan close to a heat source of laptop computers from different manufacturers, thereby ensuring the heat-dissipating effect.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
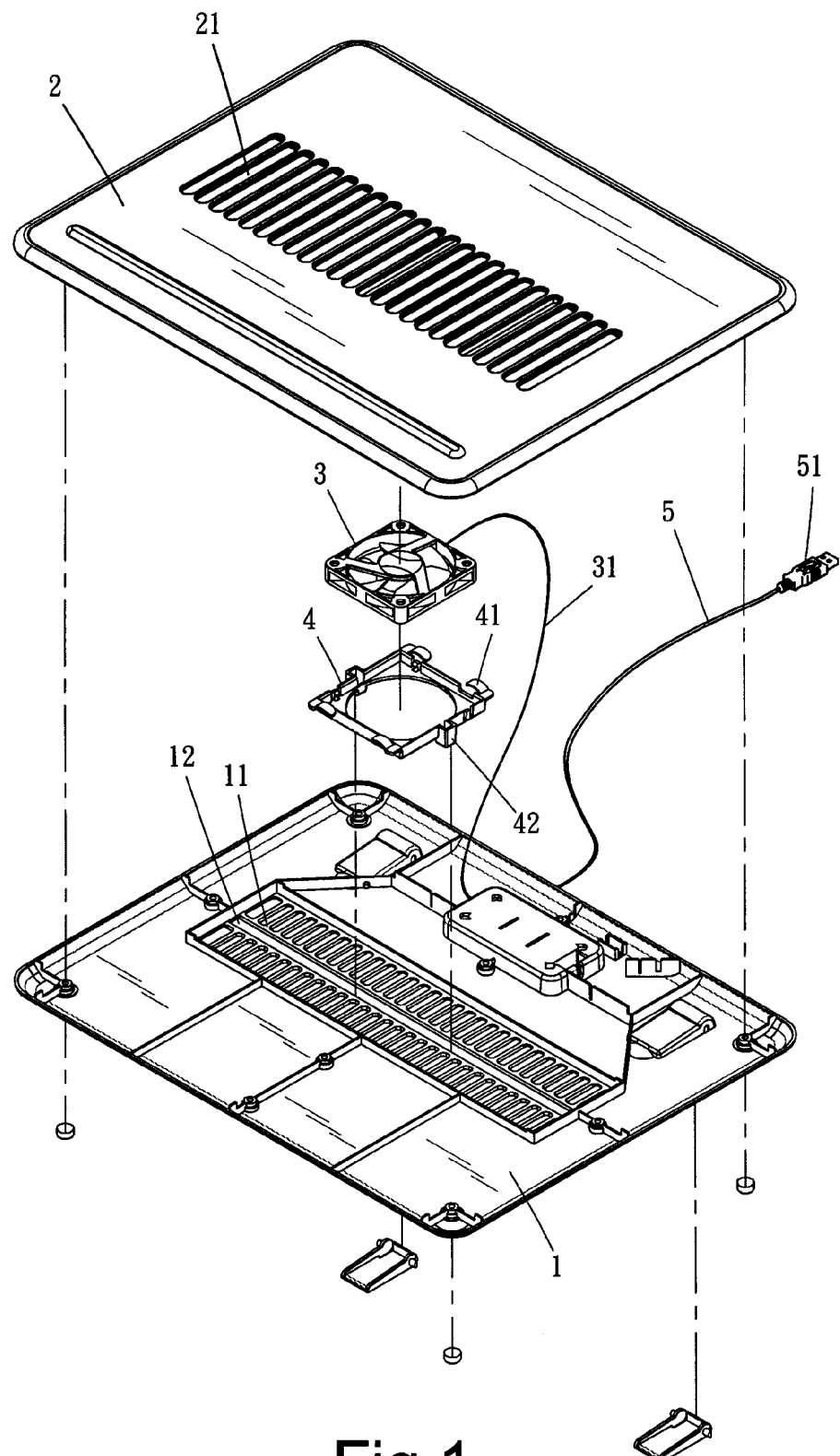
FIG. 1 is an exploded view of one embodiment of the present invention.
Figure 2:
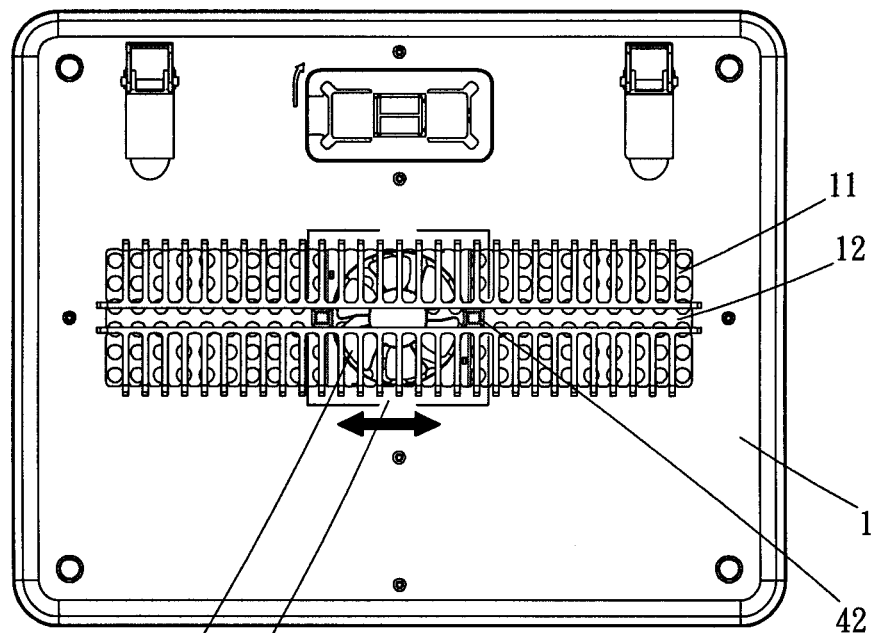
FIG. 2 is a bottom view of the embodiment of the present invention.
Figure 3:
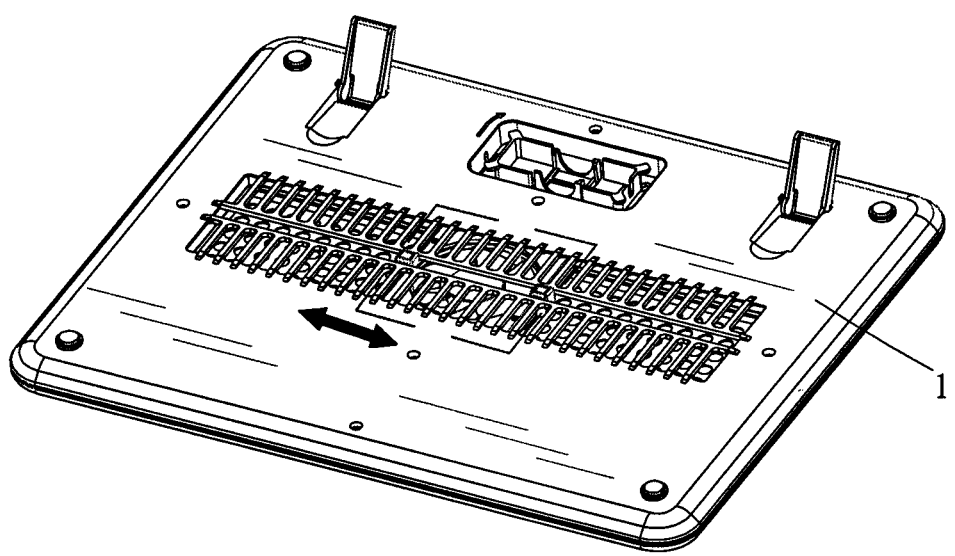
FIG. 3 is a rear perspective view of the embodiment of the present invention.
Figure 4:
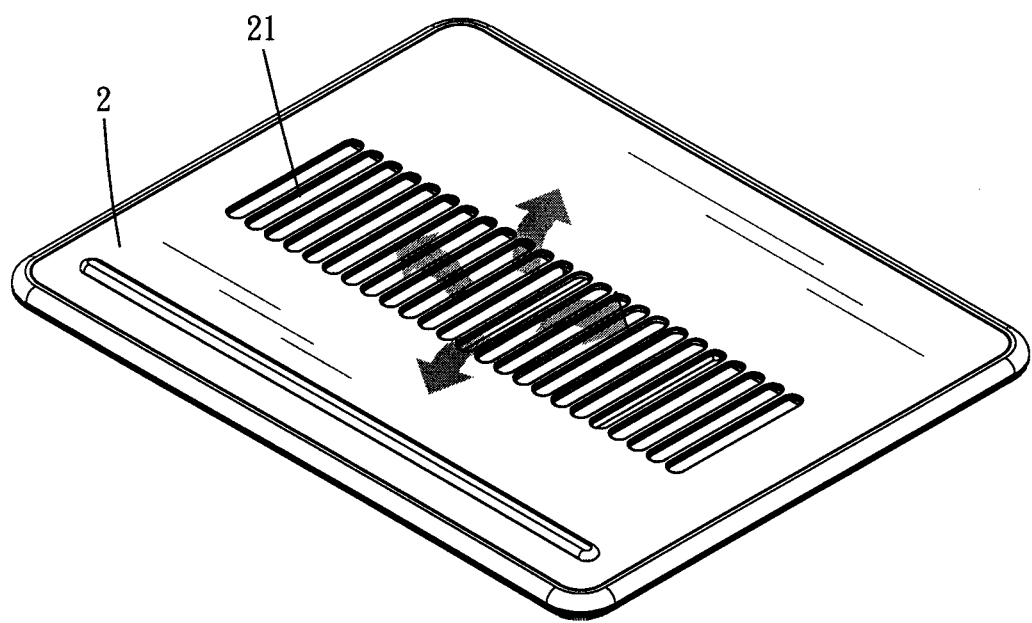
FIG. 4 is a schematic drawing showing the embodiment of the present invention dissipating heat.

Referring to FIG. 1 through FIG. 4, according to the present invention, a laptop cooling pad with heat-dissipating fans adjustable in position is characterized in that its bottom plate (1) is provided with a transverse ventilation portion (11), and its cover plate (2) is provided with a transverse ventilation frame (21) corresponding to the transverse portion (11), wherein the transverse ventilation portion (11) is provided with a transverse grove (12).

One or more heat-dissipating fans (3) are provided in the laptop cooling pad. Each said heat-dissipating fan (3) is coupled with a fan support (4) through a power cord (31). The fan support (4) has its front and rear upper edges extended with symmetrically arranged resilient retainers (41), and has its left and right edges provided with symmetrically arranged pushing nodes (42).

The fan support (4) supporting the heat-dissipating fan (3) is placed in the ventilation portion (11) of the bottom plate (1) with the pushing nodes (42) thereof inserted into the transverse grove (12), so that the pushing nodes (42) are exposed outside the bottom plate (1) to be pushed manually. Thereby, after the cover plate (2) is assembled to the bottom plate (1), when a user manually pushes the pushing nodes (42), the fan support (4) and in turn the heat-dissipating fan (3) move transversely in the laptop cooling pad along the ventilation portion (11).

The symmetrically arranged resilient retainers (41) at the front and rear upper edges of the fan support (4) are configured to be pressed by edges of the transverse ventilation frame (21) of the assembled cover plate (2), so as to provide a proper positioning force to the fan support (4).

The power cord (31) of the heat-dissipating fan (3) is electrically connected to a USB-connecting wire (5) that has a USB connector connected to a USB port of a laptop computer placed on the laptop cooling pad, so that the heat-dissipating fan (3) is powered by the laptop computer.

Figure 5:
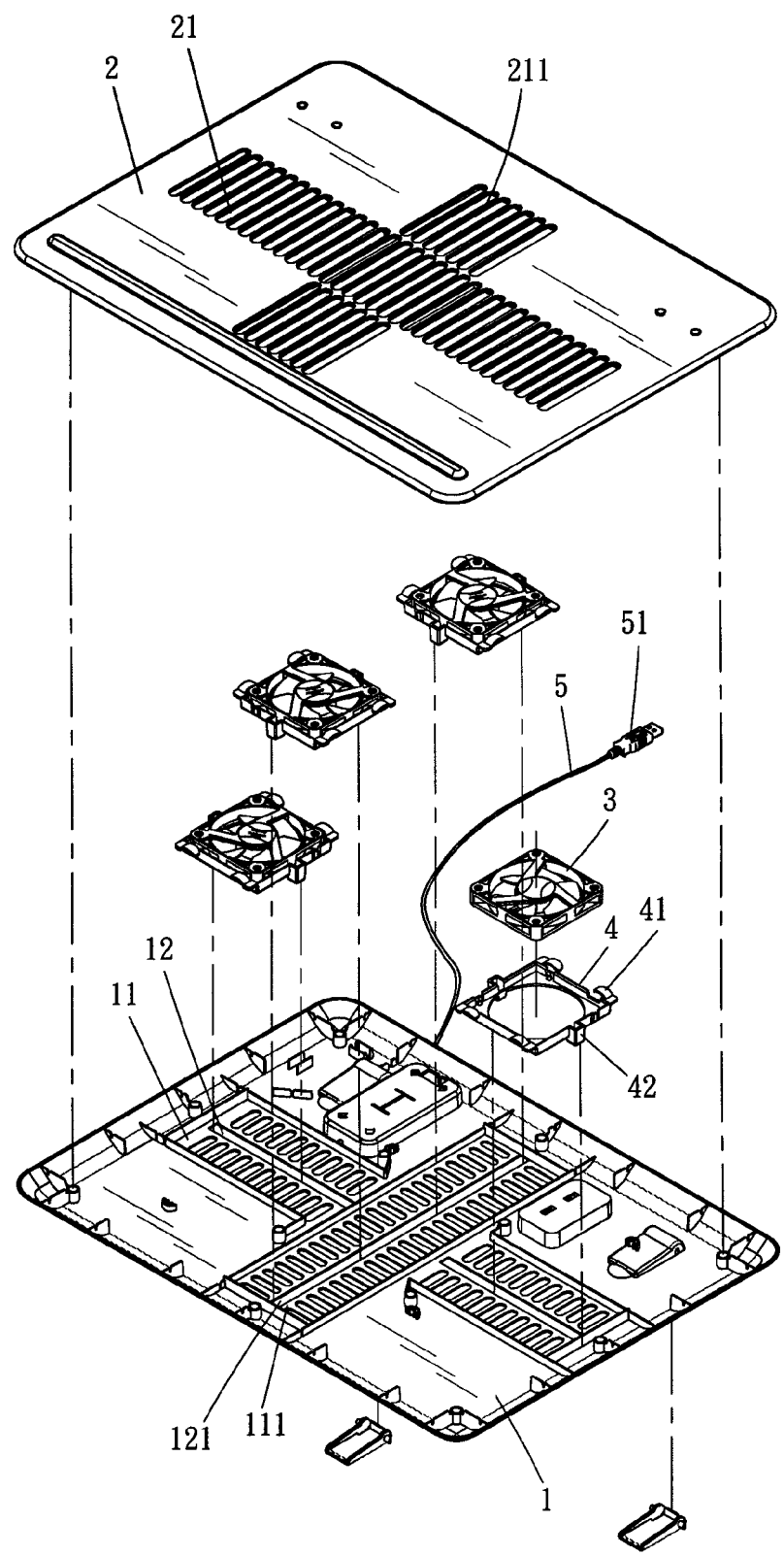
FIG. 5 is an exploded view of another embodiment of the present invention.
Figure 6:
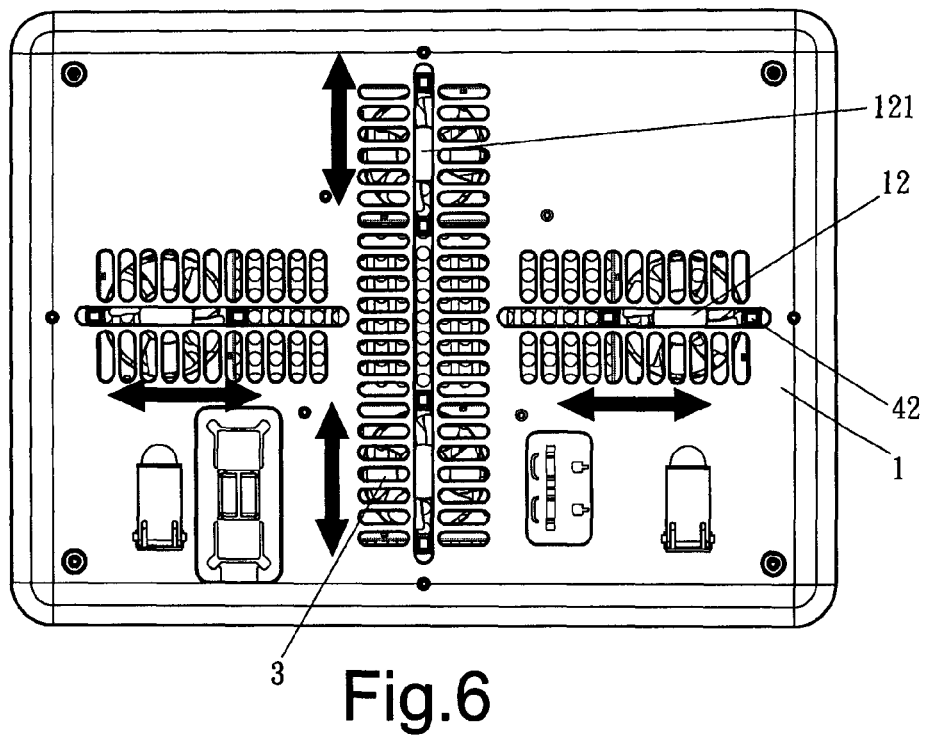
FIG. 6 is a bottom view of the second embodiment of the present invention.
Figure 7:
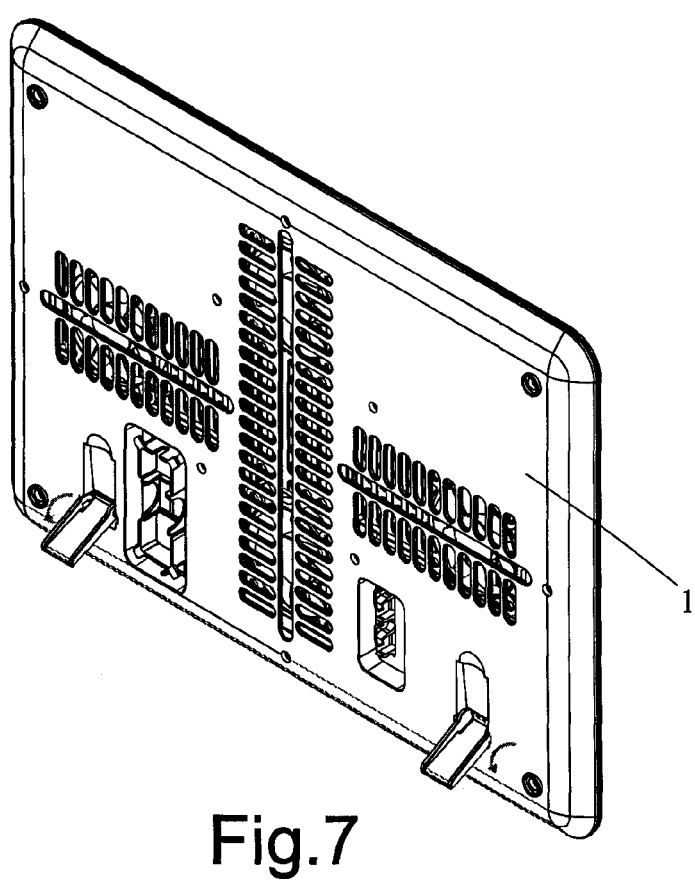
FIG. 7 is a rear perspective view of the second embodiment of the present invention.
Figure 8:
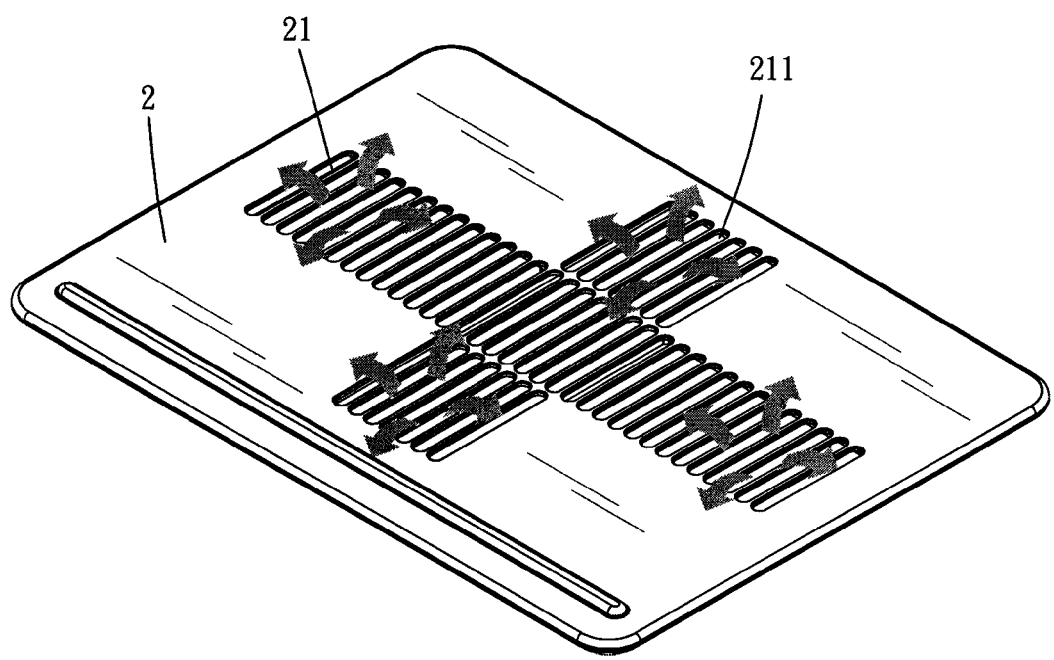
FIG. 8 is a schematic drawing showing the second embodiment of the present invention dissipating heat.

In addition to the embodiment shown in FIG. 1 through FIG. 4, the laptop cooling pad of the present invention further provides a second embodiment as depicted in FIG. 5 through FIG. 8, wherein the bottom plate (1) is further provided with a vertical ventilation portion (111) and the cover plate (2) is further provided with a vertical ventilation frame (211) that corresponds to the vertical ventilation portion (111) and has a vertical groove (121), whereby the heat-dissipating fan is allowed to be moved transversely and vertically inside the laptop cooling pad.

What is claimed is:

1. A laptop cooling pad with at least one heat-dissipating fan adjustable in position, the laptop cooling pad comprising: a bottom plate provided with a transverse ventilation portion, and a cover plate provided with a transverse ventilation frame corresponding to the transverse portion, wherein the transverse ventilation portion is provided with a transverse groove; and one or more heat-dissipating fans, each said heat-dissipating fan being coupled with a fan support through a power cord, wherein the fan support has front and rear upper edges thereof extended with symmetrically arranged resilient retainers, and has left and right edges thereof provided with symmetrically arranged pushing nodes; wherein the fan support supporting the heat-dissipating fan is placed in the ventilation portion of the bottom plate with the pushing nodes thereof inserted into the transverse grove, so that the pushing nodes are exposed outside the bottom plate to be pushed manually, whereby after the cover plate is assembled to the bottom plate, manually pushing the pushing nodes makes the fan support and, in turn, the heat-dissipating fan move transversely in the laptop cooling pad along the ventilation portion.

2. The laptop cooling pad of claim 1, wherein the symmetrically arranged resilient retainers (41) at the front and rear upper edges of the fan support (4) are configured to be pressed by edges of the transverse ventilation frame (21) of the assembled cover plate (2), so as to provide a proper positioning force to the fan support (4).

3. The laptop cooling pad of claim 1, wherein the power cord (31) of the heat-dissipating fan (3) is electrically connected to a USB-connecting wire (5) that has a USB connector (51) connected to a USB port of a laptop computer placed on the laptop cooling pad, so that the heat-dissipating fan (3) is powered by the laptop computer.

4. The laptop cooling pad of claim 1, wherein the bottom plate (1) is further provided with a vertical ventilation portion (111) and the cover plate (2) is further provided with a vertical ventilation frame (211) that corresponds to the vertical ventilation portion (111) and has a vertical groove (121), whereby the heat-dissipating fan is allowed to be moved transversely and vertically inside the laptop cooling pad.

* * * * *